United States Patent Office 3,532,616
Patented Oct. 6, 1970

3,532,616
ELECTROLYTIC MARKING DEVICES
Clifford Garnett, Calmady, Darby Gardens,
Sunbury-on-Thames, England
Filed Feb. 23, 1967, Ser. No. 617,908
Int. Cl. B23p 1/00; C23b 5/76
U.S. Cl. 204—224           1 Claim

ABSTRACT OF THE DISCLOSURE

An electrolytic marking device utilizes a conductive backing piece carrying on its work-engaging surface a pattern corresponding to the desired mark formed by insulating material on the backing piece which confines liquid electrolyte in the desired pattern. This avoids use of stencils and confines the active electrolyte only to those area which are to apply the mark.

---

This invention relates to electrolytic marking devices, such as are connected to one pole of an electrical supply and used to apply a mark electrolytically to a metal workpiece connected to another pole of the supply. One known type of such a device uses an absorbent pad soaked in electrolyte and covered by an insulating stencil, so that the marking is effected only through the apertures in the stencil. This type has the drawbacks that the stencil can be awkward to handle and that the pad can be oversoaked in electrolyte, with the result that the marking can be overdone or smudged and the workpiece can become flooded with the electrolyte. Another type uses a metallic backing piece carrying the mark as a raised die; a layer of absorbent paper soaked in electrolyte is stretched over the whole of the surface of the backing piece which carries the die, so that marking is effected only in the region of the raised portions of the die where curent can pass through the paper to the workpiece. In this type also, an excessive amount of electrolyte can be soaked up by the paper, with resultant smudging of the mark and flooding of the workpiece.

According to the present invention, an electrolytic marking device comprises an electrically conductive backing piece carrying on one surface an electrically insulating material formed into a raised pattern corresponding to the mark. Preferably, the raised pattern is a mirror image of the mark and the insulating material is absorbent, so that it can be soaked in electrolyte and the current will then pass from the conductive backing piece to the electrolyte held in the absorbent insulating material and thence to the workpiece so as to mark the latter. In some cases, however, it may be sufficient to use a nonabsorbent insulating material which simply retains a layer of electrolyte on its surface. The current then passes from the backing piece through the layer of electrolyte clinging to the sides of the raised pattern and thence to the electrolyte on the workpiece-engaging surface.

Alternatively, the raised pattern may be of a nonabsorbent insulating material forming a mirror-image negative of the mark, and raised only a small amount above the surface of the conductive backing piece, the electrolyte being retained in the areas between the raised portions either by means of an absorbent insulating material or by capillary attraction, so that marking is effected in these areas only.

The invention thus avoids the use of stencils and enables the electrolyte to be applied to the workpiece only in the areas which are to be marked. The amount of electrolyte picked up can be limited to the amount needed for making an adequate mark, so that overmarking or flooding of the workpiece can be avoided.

Figure 1:
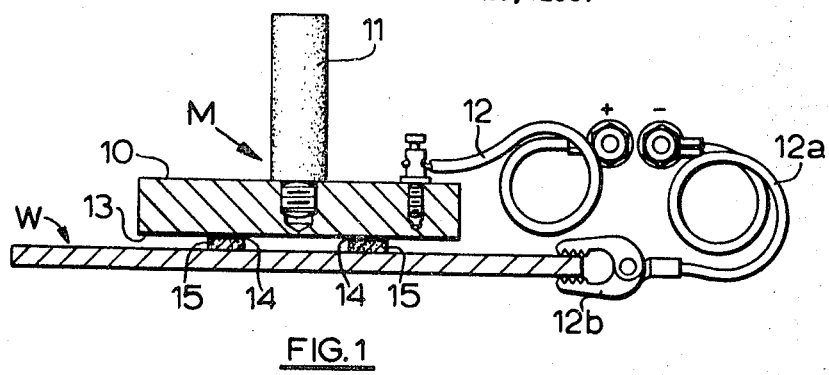
Figure 2:
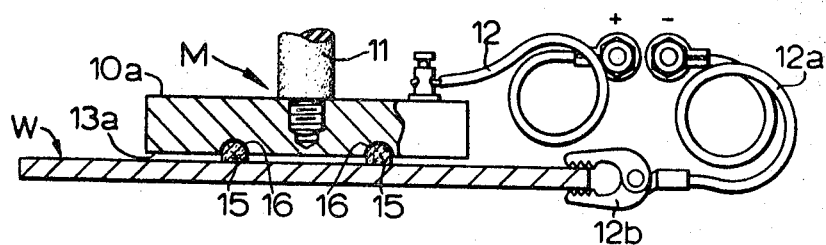
Figure 3:
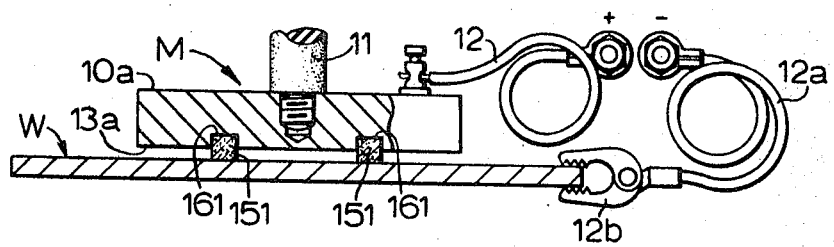
Figure 4:
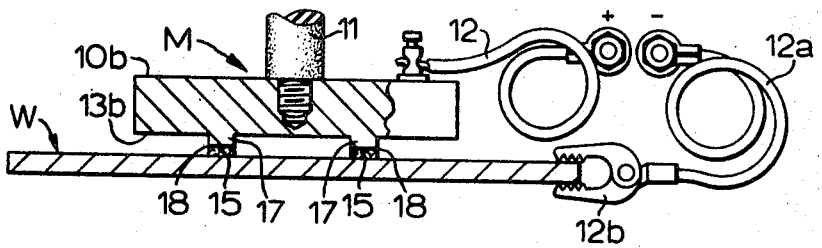
Figure 5:
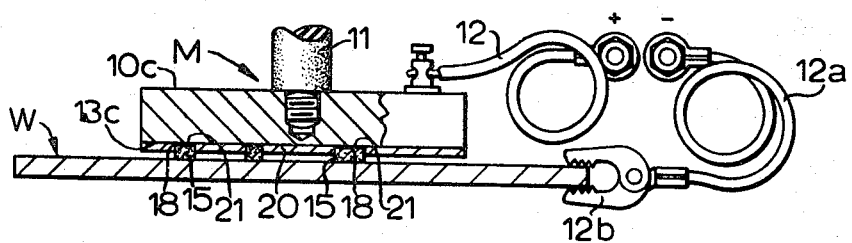

Various embodiments of the invention will now be described in more detail by way of example, and with reference to the accompanying drawings in which:

FIG. 1 is a diagrammatic cross section through a marking device according to the invention, FIG. 2 is a similar cross section of another embodiment of the invention, FIG. 3 is a similar view of a modification of the embodiment of FIG. 2, FIG. 4 is a similar view of yet another marking device in accordance with the invention, and FIG. 5 is a similar view of another embodiment.

In the embodiment shown diagrammatically in FIG. 1, the marking device M comprises an electrically conductive backing piece 10 (which may be of metal or of a conductive plastic) to which is attached an insulating handle 11. A lead 12 connects the backing piece 10 to the one terminal of an electrical supply, e.g., an alternating current supply, the other terminal of which is connected to the workpiece W by a lead 12a and a connector shown by way of example as a clip 12b. The lower surface 13 of the backing piece 10 has printed thereon a conductive adhesive 14 in a pattern forming a mirror image of the mark which is to be applied to the workpiece W. An absorbent powered or fibrous electrically insulating material 15, such as glass fibre or asbestos fibre, is blown on to the surface 13 so that it adheres to the adhesive 14 and stands proud of the surface 13 in a raised pattern. To effect eldectrolytic marking, the absorbent material 15 is soaked in electrolyte and the marking device M is applied to the workpiece W as shown in FIG. 1 so that current passes through the electrolyte which is retained in the absorbent material 15 and causes the desired mark to be applied to the workpiece W.

The embodiment shown in FIG. 2 differs from that shown in FIG. 1 in that channels 16 are cut in the undersurface 13a of the backing piece 10a, and the absorbent insulating material 15, e.g., in the form of a rope or sliver, is held in these channels by a conductive adhesive, projecting from the surface 13a as before. The marking device is used in the same manner as described above.

The embodiment shown in FIG. 3 is generally similar to that shown in FIG. 2 except that the channel or channels 161 are rectangular in section and the insulating material 151 which fills them is of corresponding rectangular section and is of a nonabsorbent type. With this embodiment the lower surface 13a of the backing piece 10a is first dipped in the electrolyte solution, which forms a conductive layer on the lower surface and on the sides of the insulating material 151, so that current can flow from the backing piece 10a through the film of electrolyte on the sides of the insulating material to the electrolyte on the lower surface of the insulating material 151 to cause marking.

In the embodiment of FIG. 4 the lower surface 13b of the backing piece 10b is formed with a raised die pattern 17 forming a mirror image of the desired mark. An absorbent insulating material 15 similar to that used in the embodiment of FIG. 1 is secured on the raised portions 17 by means of a conductive adhesive 18. The operation of this embodiment is similar to those of FIGS. 1 and 2.

In the embodiment shown in FIG. 5 the lower surface 13c of the metal backing piece 10c is covered by a thin layer 20 of a nonabsorbent insulating photosensitive lacquer, as supplied by the Kodak Company. A mirror image of the mark which is to be applied to the workpiece W is printed on to the photosensitive lacquer 20 and on development the lacquer is removed from the areas corresponding to the mark so as to lay bare the metal surface 13c in channels 21 and to leave the insulating material 20 standing out from the metal surface as a mirror image negative of the mark. A conductive adhesive 18 which will adhere to the metal but not to the insulating material 20 is then applied to the surface 13c, so as to coat the channels 21, and a powdered or fibrous absorbent insulating material 15 is applied to the surface 13c so as to be held in the channels 21 by the adhesive 18. When the lower surface of the backing piece 10c is dipped in the liquid electrolyte, electrolyte is retained in the absorbent insulating material 15 and on applying the marking device M to the workpiece W current can pass through the electrolyte in the regions of these channels 21 to apply the mark. This embodiment is particularly useful for applying marks comprising fine lines.

In some cases, the absorbent material 15 can be omitted from the embodiment of FIG. 5, the electrolyte being retained in the channels 21 by capillary attraction.

The principal advantages of the devices described are that they avoid the need for use of stencils and that they apply the electrolyte to the workpiece only in the areas where the mark is to be applied. They can be designed to pick up sufficient electrolyte to make an adequate mark and no more. Thus overmarking or flooding of the workpiece can be avoided.

For marking workpieces of curved form, the backing piece 10 may be made of a thin flexible material which will conform to the curved surface of the workpiece when applied to it.

What is claimed is:
1. In an electrolytic marking device comprising a conductive backing piece having a mark carrying surface, and a finely comminuted and absorbent electrically insulating material carried on said surface, said insulating material being formed into a pattern corresponding to a negative image of the desired mark, said pattern standing out from said surface of said backing piece and capable of absorbing and holding a liquid electrolyte confined to said pattern and in electrical contact with said backing piece, said pattern including the developed portions of a photo-sensitive insulating lacquer on said backing piece surface comprising recesses in said lacquer extending to said backing piece surface and confining said absorbent insulating material to said recesses.

References Cited

UNITED STATES PATENTS

| | | | |
|---|---|---|---|
| 607,484 | 7/1898 | Rieder | 204—224 |
| 2,726,200 | 12/1955 | Holsapple | 204—224 XR |
| 3,240,684 | 3/1966 | Martin et al. | 204—143 XR |

FOREIGN PATENTS

| | | |
|---|---|---|
| 39–320 | 1/1964 | Japan. |
| 483,503 | 4/1938 | Great Britain. |

HOWARD S. WILLIAMS, Primary Examiner

D. R. VALENTINE, Assistant Examiner

U.S. Cl. X.R.

204—143